(12) United States Patent
Chino et al.

(10) Patent No.: US 7,628,244 B2
(45) Date of Patent: Dec. 8, 2009

(54) STEERING DEVICE

(75) Inventors: Naotaka Chino, Yokohoma (JP); Noriki Kubokawa, Zama (JP); Takaaki Eguchi, Yokohoma (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 221 days.

(21) Appl. No.: 11/713,002

(22) Filed: Mar. 2, 2007

(65) Prior Publication Data

US 2007/0221434 A1 Sep. 27, 2007

(30) Foreign Application Priority Data

Mar. 3, 2006 (JP) .............................. 2006-057269

(51) Int. Cl.
*F16C 1/10* (2006.01)
(52) U.S. Cl. ..................... 180/402; 180/444; 74/500.5
(58) Field of Classification Search ................ 180/402, 180/425, 440, 444, 447; 74/473.14, 473.15, 74/500.5, 502.5, 502.6, 505, 506, 388 PS, 74/89.22; 474/101; 242/577, 578
See application file for complete search history.

(56) References Cited

U.S. PATENT DOCUMENTS

| | | | | |
|---|---|---|---|---|
| 1,554,224 A | * | 9/1925 | Mcgrath | ...................... 52/646 |
| 3,118,962 A | * | 1/1964 | Hammond | .................. 351/118 |
| 4,112,784 A | * | 9/1978 | Cosh | ...................... 74/501.5 R |
| 4,848,432 A | * | 7/1989 | Connolly | .............. 160/178.1 R |
| 5,555,769 A | * | 9/1996 | Lichtenberg | ............... 74/89.22 |
| 5,924,517 A | * | 7/1999 | Sugiura | ...................... 180/417 |
| 5,937,704 A | * | 8/1999 | Shimizu et al. | ............ 74/500.5 |

FOREIGN PATENT DOCUMENTS

| | | |
|---|---|---|
| DE | 197 14 297 A1 | 11/1997 |
| JP | 10-217989 | 8/1998 |
| JP | 11-011325 | 1/1999 |
| JP | 2004-142644 | 5/2004 |
| JP | 2004-189064 | 7/2004 |
| JP | 2004-189108 | 7/2004 |

* cited by examiner

*Primary Examiner*—Lesley D. Morris
*Assistant Examiner*—Levon Fiore
(74) *Attorney, Agent, or Firm*—Drinker Biddle & Reath LLP

(57) ABSTRACT

A steering device includes a first housing, first and second cables, and first and second sheaths. The first housing includes a first part that supports a rotatable first cable pulley, and a second part that is disposed for relative displacement with respect to the first part. The first cable is at least partially wound on the first cable pulley in a first direction of rotation. The second cable is at least partially wound on the first cable pulley in a second direction of rotation. The first sheath surrounds the first cable and extends between first and second ends, and the first end of the first sheath is coupled to the second part of the first housing. The second sheath surrounds the second cable and extends between first and second ends, and the first end of the second sheath is coupled to the second part of the first housing.

10 Claims, 8 Drawing Sheets

FIG. 6 - (Related Art)
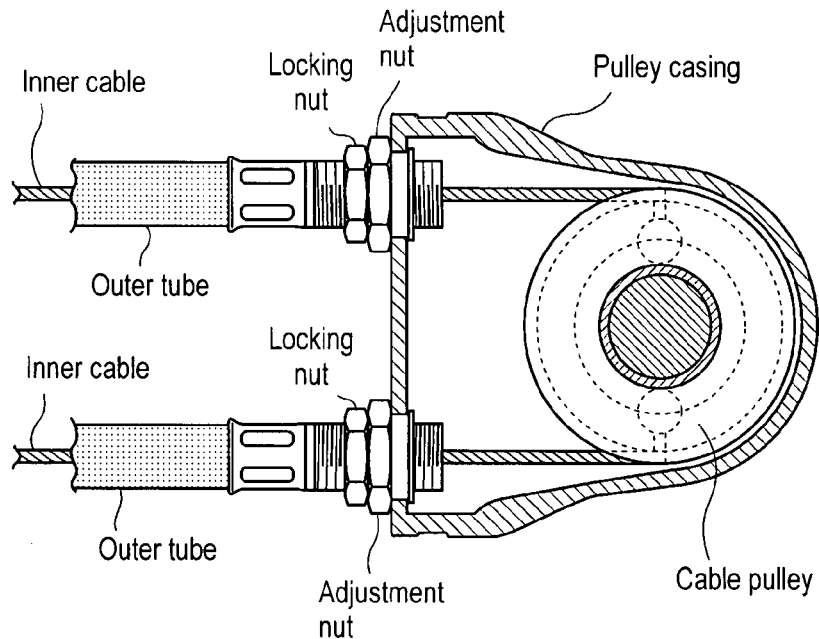
FIG. 7(A) – (Related Art)
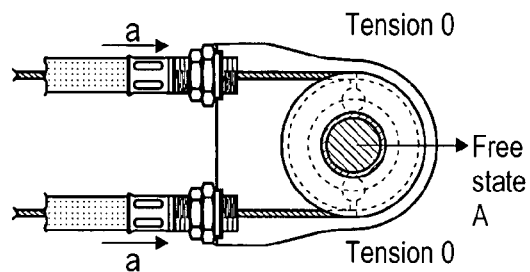
FIG. 7(C) – (Related Art)
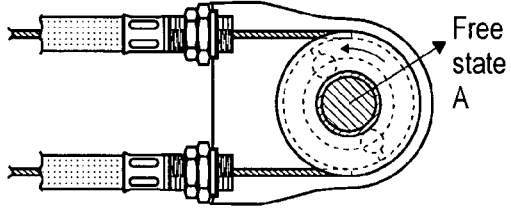
FIG. 7(B) – (Related Art)
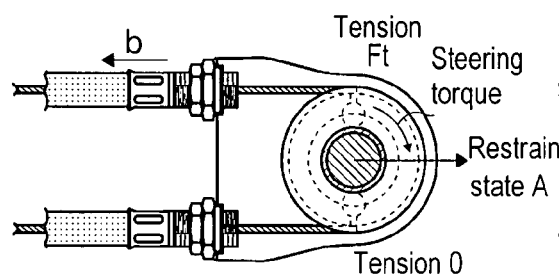
FIG. 7(D) – (Related Art)
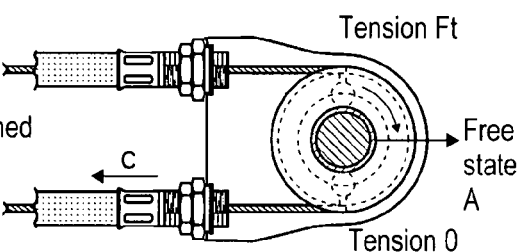

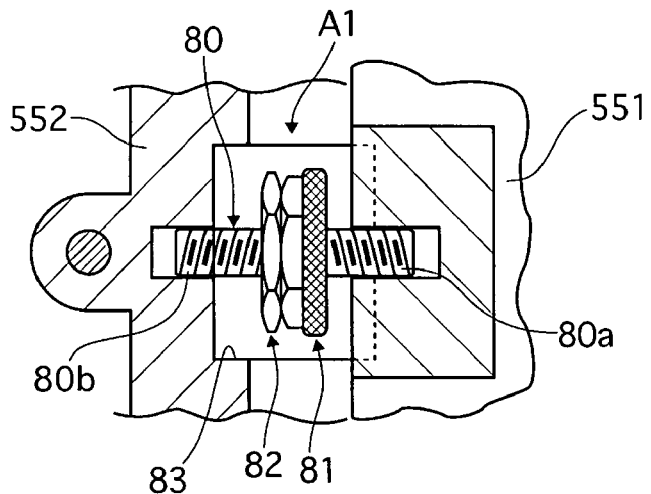

STEERING DEVICE

CROSS-REFERENCE TO RELATED APPLICATIONS

This application claims priority under 35 U.S.C. §119 to Japanese Patent Application No. 2006-057269, filed on Mar. 3, 2006, the disclosure of which is incorporated by reference herein in its entirety.

BACKGROUND OF THE INVENTION

1. Field of the Invention

The present invention pertains to the technical field of cable-based steering devices in which a steering wheel and a steering gear mechanism are connected using actuation cables, such as Bowden cables.

2. Description of Related Art

In a related cable-based steering device, a steering wheel and a steering gear mechanism are connected using two actuation cables in which a cable extends through a sheath. In the related cable-based steering device, a tension adjustment mechanism adjusts the tensions of the cables while the steering wheel and the steering gear mechanism are in the neutral state, i.e., the steering wheel and the steering gear mechanism are centered. Tension adjustment of the cables is provided by separate adjustment nuts at each of the junctions between the sheaths and a pulley casing. The pulley casing houses a pulley to which is connected first ends of each of the two cables.

The related cable-based steering device suffers from a number of disadvantages including that, in setting the tension of the cables, each of the two adjustment nuts needs to be separately adjusted while the steering gear mechanism and the steering wheel are both in the neutral state. This is a cumbersome operation that requires a large number of steps.

BRIEF SUMMARY OF THE INVENTION

The present invention relates to overcoming the disadvantages of the related cable-based steering device and providing a cable-based steering device in which the tensions of cables may be adjusted using a quick and simple cable tension adjustment operation.

In accordance with an aspect of an embodiment of the invention, there is provided a steering device that includes a steering side cable pulley that rotates in response to a driver operating an actuation part, a steering control wheel side cable pulley that rotates a wheel turning part to turn steering control wheels, two cables that are wound in opposite directions around the cable pulleys, a first pulley case that houses the steering wheel side cable pulley, a second pulley case that houses the steering control wheel side cable pulley, and two sheaths that cover the two cables, respectively, First ends of the two sheaths are connected to the first pulley case, and second ends of the two sheaths are connected to the second pulley case. At least one of the first and second pulley cases has a pulley supporting part that supports a respective one of the pulleys in a freely rotatable fashion and has a cable supporting part that supports the respective ends of the two sheaths. The pulley supporting and cable supporting parts are relatively displaceable in the take-up and pay-out directions of the cables.

In accordance with another aspect of an embodiment of the invention, there is provided a steering device that includes a pulley supporting part and a cable supporting part that are relatively movable with respect to each other in order to adjust the tensions of the two cables.

In accordance with yet another aspect of an embodiment of the invention, there is provided a steering device that includes a pulley supporting part that supports a pulley in a freely rotatable fashion, and a cable supporting part that supports two end parts of sheaths. Spacing between the supports for the pulley and for the two sheaths (i.e., where the outer tubes and the cable supporting case are connected) changes in response to relative movement of the pulley supporting part and the cable supporting part. Accordingly, tensions of the two cables are adjusted by changing the spacing between the supports for the pulley and for the two sheaths.

In accordance with a further aspect of an embodiment of the invention, there is provided a steering device including a first housing, first and second cables, and first and second sheaths. The first housing includes a first part that supports a first cable pulley for relative rotation with respect to the first housing, and a second part that is disposed for relative displacement with respect to the first part of the first housing. The first cable is at least partially wound on the first cable pulley in a first direction of rotation of the first cable pulley. The second cable is at least partially wound on the first cable pulley in a second direction of rotation of the first cable pulley. The first sheath extends between first and second ends, and the first end of the first sheath is coupled to the second part of the first housing. The first cable is slidingly disposed in the first sheath. The second sheath also extends between first and second ends, and the first end of the second sheath is coupled to the second part of the first housing. The second cable is slidingly disposed in the second sheath.

In accordance with yet a further aspect of an embodiment of the invention, there is provided a steering device including first and second cables, first and second sheaths, and an adjusting means. The first cable is at least partially wound on a first cable pulley in a first direction of rotation of the first cable pulley. The second cable is at least partially wound on the first cable pulley in a second direction of rotation of the first cable pulley. The first sheath extends between first and second ends, with the first cable slidingly disposed in the first sheath. The second sheath extends also between first and second ends, with the second cable slidingly disposed in the second sheath. The first ends of both the first and second sheaths are disposed proximate to the first cable pulley. The adjusting means provides simultaneous adjustment of a relative displacement between the first cable pulley and each of the first ends of the first and second sheaths.

Thus, adjusting the tensions of the cables may be achieved quickly and easily in response to moving the pulley supporting part and the cable supporting part relative to each other. This is in contrast to the related cable-based steering device wherein adjusting the tensions of the cables requires a cumbersome and time-consuming operation that includes independently adjusting the separate adjustment nuts.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 6 is a cross sectional view of a related cable-based steering device showing a pulley casing part with a cable tension adjustment mechanism.

FIGS. 7(A) to 7(D) explain the cable tension adjustment function of the related cable-based steering device shown in FIG. 6.

FIGS. 8(a) to 8(e) explain the cable tension adjustment function of the steering side cable pulley part in accordance with the first embodiment.

DETAILED DESCRIPTION OF THE PREFERRED EMBODIMENTS

Preferred exemplary embodiments of a cable-based steering device for a steer-by-wire (also called "SBW" or "Steer By Wire") system will now be explained with respect to the figures.

Configuration of the SBW

Figure 1:
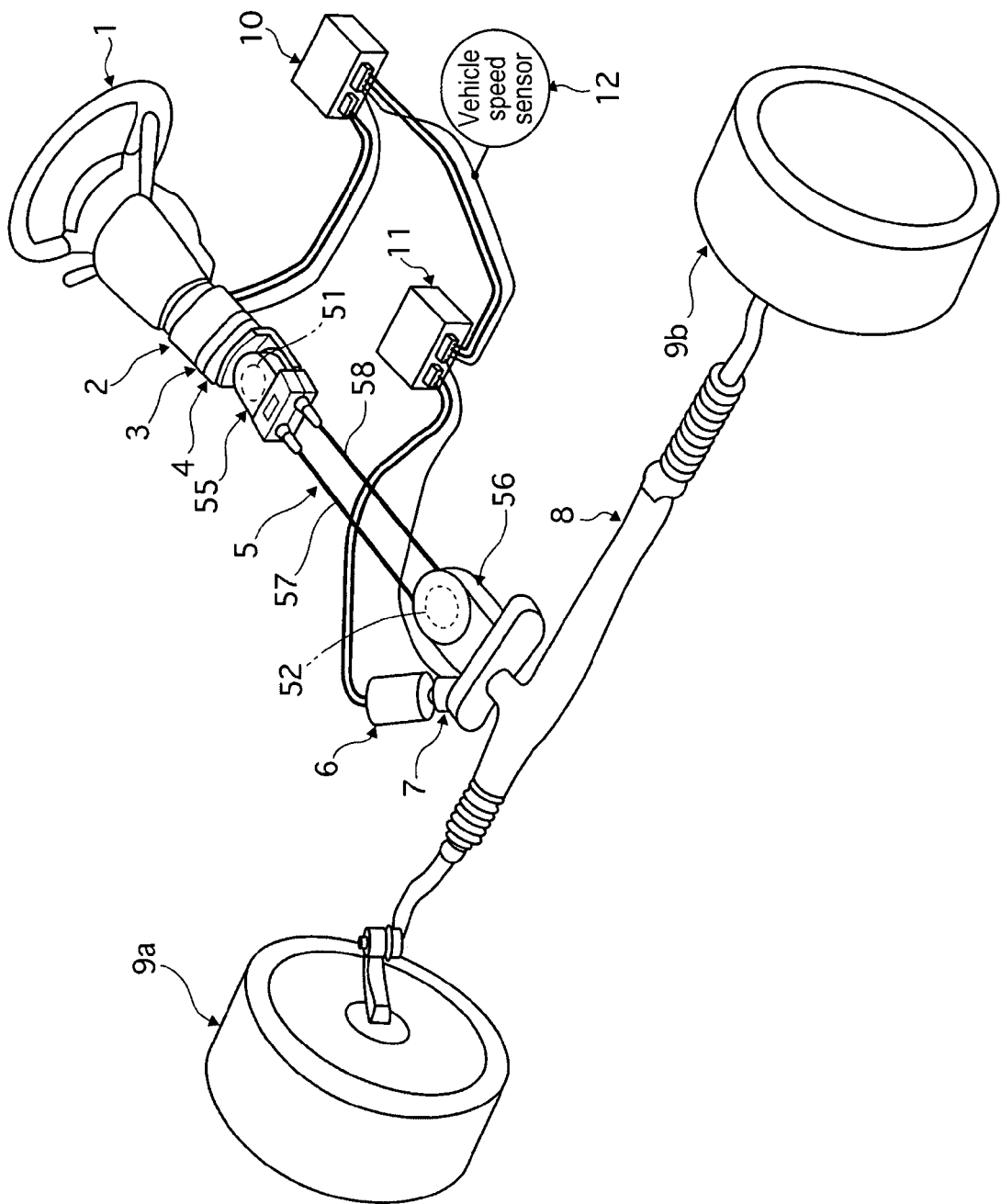
FIG. 1 is a diagram showing a steer-by-wire (SBW) system including a first embodiment of a cable-based steering device.

FIG. 1 shows a configuration of a steer-by-wire system that includes a first embodiment of a cable-based steering device. A steer-by-wire system includes a steering motor that drives a steering mechanism so as to steer the steering control wheels according to the steering angle of the steering wheel during normal times. A backup cable mechanism provides a mechanical connection between the steering wheel and the steering mechanism to enable steering in the event of an electrical system failure.

The SBW system is equipped with a steering wheel I (also called an "actuation part"), a steering reaction motor 2, a steering angle sensor 3, a backup clutch 4, a backup cable mechanism 5, a wheel turning motor 6, a wheel turning angle sensor 7, steering mechanism 8 (also called a "wheel turning part"), a right front wheel 9a, left front wheel 9b, a steering reaction controller 10, a wheel turning device controller 11, and a vehicular velocity sensor 12. As it is used herein, the phrase "steering controlled wheel" may refer to any pivotally disposed wheel for changing the direction of movement of a vehicle, e.g., either or both of right and left front wheels 9a, 9b.

According to the SBW system shown in FIG. 1, a driver of the vehicle operates steering wheel 1. In its normal configuration, steering mechanism 8 is cut off mechanically from steering wheel 1 and is used to turn left and right front wheels 9a and 9b, steering reaction motor 2 provides a steering reaction force to steering wheel 1, and wheel turning motor 6 provides a wheel turning force to steering mechanism 8. The SBW system is further provided with a mechanical backup to the electrical system and includes backup cable mechanism 5 that is mechanically connected to steering mechanism 8. Backup clutch 4 mechanically connects/disconnects steering wheel 1 to/from backup cable mechanism 5.

According to the SBW system shown in FIG. 1, wheel turning device controller 11 outputs a control command to drive wheel turning motor 6 so as to mechanically disconnect steering wheel 1 from steering mechanism 8. Specifically, steering wheel 1 is disconnected from backup cable mechanism 5 by releasing backup clutch 4 in order to attain the wheel turning angle that matches a given actuation state of steering wheel 1. Steering reaction device controller 10 outputs a control command to drive steering reaction motor 2 so as to provide a steering reaction force that matches the given steering state of steering mechanism 8.

In addition, in the event of a malfunction of an electrical part of the SBW system, backup clutch 4 is engaged so as to mechanically connect steering wheel 1 to steering mechanism 8 via backup cable mechanism 5, and SBW electrical control is suspended. If at least steering reaction motor 2 or wheel turning motor 6 is still functional, the system may switch from SBW control to power assisted control so as to drive at least steering reaction motor 2 or wheel turning motor 6 in order to add an assisting force to the operating force of the driver.

Configuration of Backup Cable Mechanism

Figure 2:
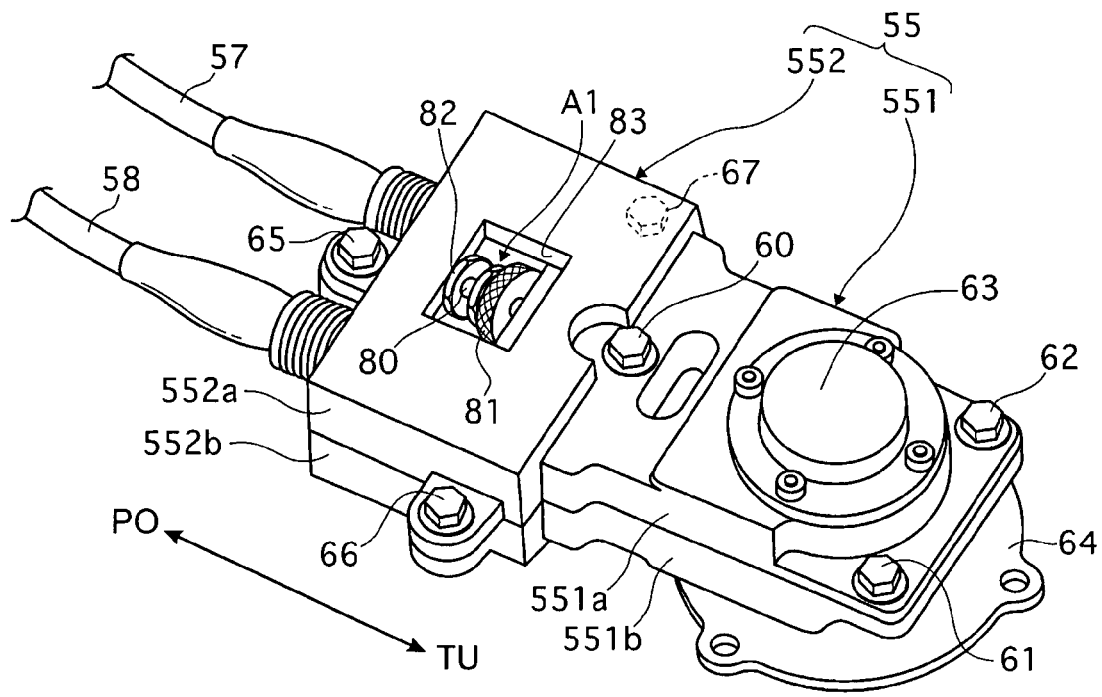
FIG. 2 is a perspective view of a steering side cable pulley part in accordance with the first embodiment.
Figure 3:
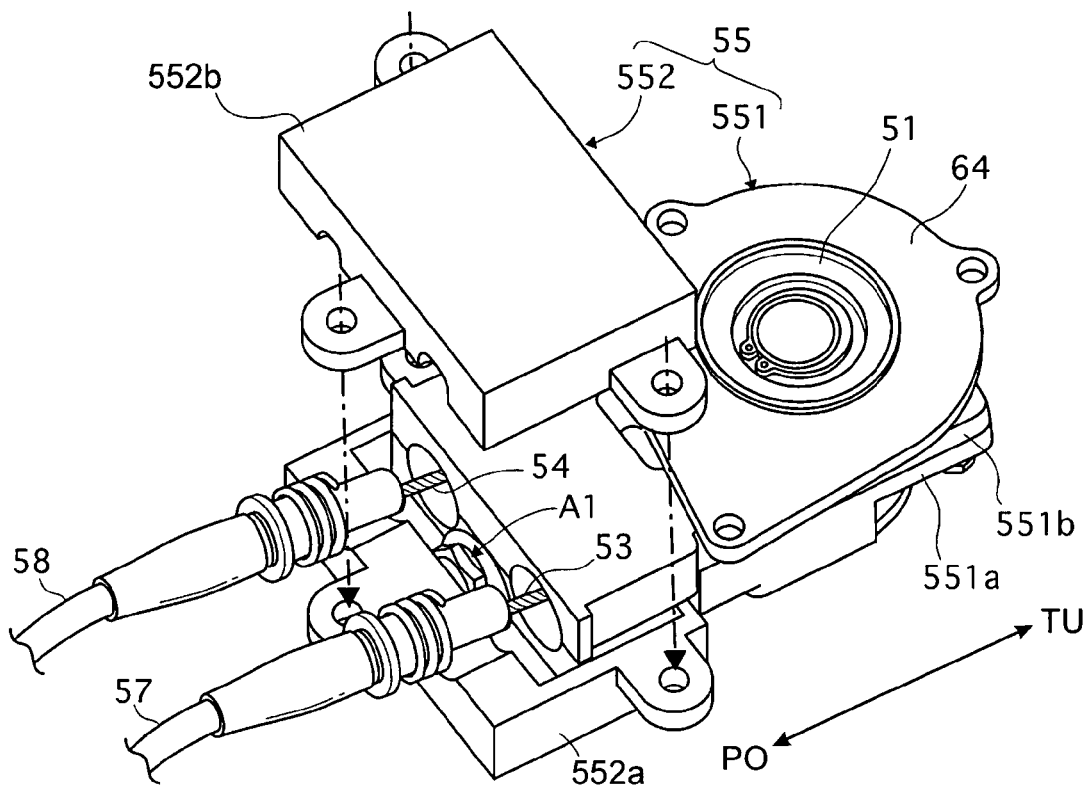
FIG. 3 is an exploded view of the steering side cable pulley part in accordance with the first embodiment.

Referring additionally to FIGS. 2 and 3, details of backup cable mechanism 5 shown in FIG. 1 will now be described.

Backup cable mechanism 5 includes a steering side cable pulley 51 that provides an actuation part that is operated by the driver and a steering control wheel side cable pulley 52 that provides a wheel turning part used for turning left and right front wheels 9a, 9b.

Two cables 53, 54 are at least partially wound around steering side cable pulley 51 in opposite directions and first ends of the cables 53, 54 are fixed to steering side cable pulley 51. For example, referring additionally to FIG. 4, a winding direction 53w of cable 53 on steering side cable pulley 51 may be clockwise and a winding direction 54w of cable 54 on steering side cable pulley 51 may be counter-clockwise. Similarly, cables 53, 54 are wound around steering control wheel side cable pulley 52 in opposite directions and second ends of the cables 53, 54 are fixed to steering control wheel side cable pulley 52. Accordingly, steering side cable pulley 51 and steering control wheel side cable pulley 52 are rotationally coupled via cables 53, 54.

Backup cable mechanism 5 includes a first pulley housing 55 (also called simply a "first housing"), which rotationally supports steering side cable pulley 51, and a second pulley housing 56 (also called simply a "second housing"), which rotationally supports steering control wheel side cable pulley 52.

As particularly shown in FIGS. 2 and 3, first pulley housing 55 and second pulley housing 56 are mechanically coupled via two sheaths 57 and 58. Cables 53, 54 are slidingly disposed in sheaths 57, 58, respectively. Thus, cable 53 in sheath 57 and cable 54 in sheath 58 provide a pair of Bowden cables.

First pulley housing 55 includes a pulley supporting part 551, which supports steering side cable pulley 51 in a freely rotatable fashion, and a cable supporting part 552, which is coupled to first ends of outer tubes 57, 58. Cable supporting part 552 is supported for relative displacement with respect to pulley supporting part 551. Preferably, relative displacement is in take-up TU and pay-out PO directions of cables 53, 54.

Figure 4:
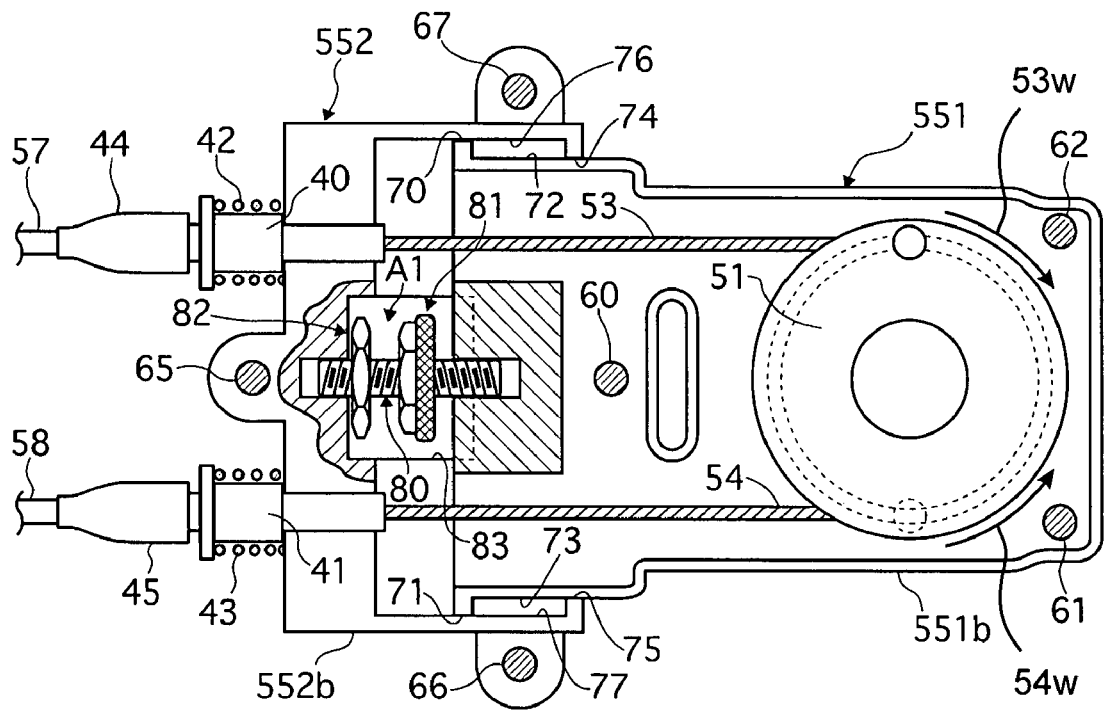
FIG. 4 is a cross sectional view of a first pulley case in accordance with the first embodiment.
Figure 5:
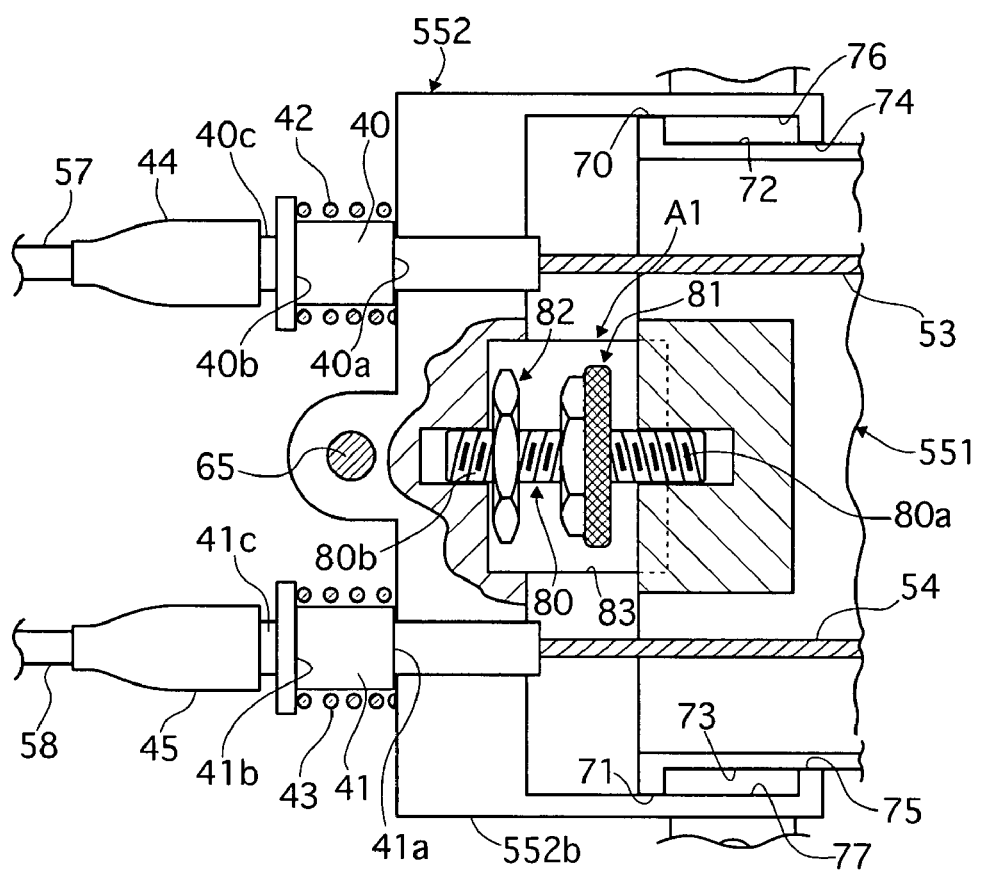
FIG. 5 is an enlarged cross sectional view of a first cable tension adjustment mechanism in accordance with the first embodiment.

According to a first embodiment, a cable tension adjustment mechanism A1 is capable of simultaneously adjusting the tensions of cables 53, 54 by adjusting the relative positional relationship between pulley supporting part 551 and cable supporting part 552 in the take-up TU and pay-out PO directions of cables 53, 54. Referring additionally to FIGS. 4 and 5, cable tension adjustment mechanism A1 is provided between pulley supporting part 551 and aforementioned cable supporting part 552.

Preferably, pulley supporting part 551 has a split structure that includes a pulley supporting case upper 551a and pulley supporting case lower 551b. Pulley supporting case upper 551a and pulley supporting case lower 551b may be fixed together using bolts 60, 61, and 62, or any equivalent system of fastening. An upper surface cover 63 is fixed to pulley supporting part 551 and covers the upper surface of steering side cable pulley 51, and a lower surface bracket 64 is fixed to pulley supporting part 551 and covers a part of the lower surface of steering side cable pulley 51. Preferably, lower surface bracket 64 may also be used to fix pulley supporting part 551 at the actuation part side.

Preferably, cable supporting part 552 has a split structure that includes cable supporting case upper 552a and cable supporting case lower 552b. Cable supporting case upper 552a and cable supporting case lower 552b may be fixed together using bolts 65, 66, and 67, or any equivalent system of fastening.

Preferably, cable supporting part 552 is formed so as to slidably receive an end part of pulley supporting part 551. As shown in FIG. 3, the end part of pulley supporting part 551 is positioned with respect to cable supporting case upper 552a, and cable supporting case lower 552b is positioned thereon, with bolts 65, 66, and 67 securing together pulley supporting part 551 and cable supporting part 552.

Configuration of a Slide-Fitting Mechanism of the Cases

Referring particularly to FIGS. 4 and 5, details of a sliding relationship between pulley supporting part 551 and the aforementioned cable supporting part will now be described. FIG. 4 is a cross sectional view of first pulley housing 55 supporting steering side cable pulley 51 of the backup cable mechanism 5 according to the first embodiment, and FIG. 5 is an enlarged cross sectional view of first cable tension adjustment mechanism A1 provided according to the first embodiment.

Preferably, pulley supporting part 551 includes pairs of first guiding convex surfaces 70, 71 and first guiding concave surfaces 72, 73 that are formed at outer circumferential regions on both sides of pulley supporting part 551. Correspondingly, cable supporting part 552 includes pairs of second guiding convex surfaces 74, 75 and second guiding concave surfaces 76, 77 that are formed at inner circumferential regions on both sides of cable supporting part 552. First guiding convex surfaces 70, 71 and second guiding convex surfaces 74, 75 are provided at positions such that they are shifted from each other in the take-up TU and pay-out PO directions of cables 53, 54.

Preferably, first guiding convex surfaces 70, 71 slidingly engage second guiding concave surfaces 76, 77, and second guiding convex surfaces 74, 75 slidingly engage first guiding concave surfaces 72, 73. Accordingly, a slide-fitting mechanism is provided between pulley supporting part 551 and cable supporting part 552 so as to facilitate relative displacement in the take-up TU and pay-out PO directions of cables 53, 54.

Configuration of a First Cable Tension Adjustment Mechanism

A sliding screw shaft 80 (also called simply a "shaft") includes a first threaded portion 80a and second threaded portion 80b. Preferably, first and second threaded portions 80a, 80b have opposite threads, i.e., one is left-hand threaded and one is right-hand threaded. First threaded portion 80a threadingly engages pulley supporting part 551 and second threaded portion 80b threadingly engages cable supporting part 552 such that turning the shaft 80 causes relative movement in the take-up TU and pay-out PO directions of cables 53, 54. A locking member 82 is provided for setting the desired relative displacement and preventing further relative displacement until locking member 82 is unlocked. As will be described in greater detail with respect to FIG. 9, sliding screw shaft 80 may alternatively be provided with a spindle part 80b' instead of second threaded part 80b.

Referring again to FIGS. 4 and 5, first cable tension adjustment mechanism A1 includes shaft 80, which may preferably be disposed midway between cables 53, 54. A turning operator (also called a "turning operation member") rotates the shaft 80. For example, a knurled thumb nut 81 (also called a "knurled nut") is fixed for rotation with shaft 80 and is disposed between first and second portions 80a, 80b, and a locking nut 82 threadingly engages second threaded part 80b of sliding screw shaft 80. Preferably, locking member 82 is locked when it is turned so as to abuttingly engage cable supporting part 552. A cable tension adjustment window 83 is preferably defined by cable supporting case upper 552a of cable supporting part 552.

Additionally referring to FIG. 5, cables 53, 54 extend through cable pipes 40 and 41, springs 42 and 43 are provided between cable pipes 40, 41 and cable supporting part 552, and tube covers 44 and 45 cover first ends of sheaths 57, 58. Preferably, cable supporting part 552 supports the respective first end parts of sheaths 57, 58 via cable pipes 40, 41. Preferably, cable pipes 40, 41 include respective engagement step surfaces 40a and 41a, which may abuttingly engage cable supporting part 552, spring supporting surfaces 40b and 41b, which support springs 42, 43, and tube cover attachment parts 40c and 41c, which provide attachments for tube covers 44, 45.

Preferably, the free length of springs 42, 43 is longer than the distance between engagement step surfaces 40a, 41a and spring supporting surfaces 40b, 41b. For example, springs 42, 43 are preferably contracted during adjustment of the tensions cables 53, 54 such that the spring forces obtained by multiplying the amount of contraction by a spring constant roughly match the tensions of cables 53, 54.

In order to explain the function and features of first cable tension adjustment mechanism A1, it is helpful to also explain the advantages with respect to a related cable-based steering device.

Actuation cables used for cable-based steering devices are configured with cables disposed in sheaths such that the cables moved relative to the sheaths so as to transmit a wheel turning torque, which is provided by the driver at the steering wheel, through to the steering gear. When a wheel turning torque is not applied to the steering wheel, prescribed tensions (e.g., approximately 40 to 50 Newtons) may be provided to the cables so as to prevent play of the steering wheel, or at least avoid any more play than is necessary.

In a related steering device as shown in FIG. 6, a tension adjustment mechanism includes two separate sets of connection parts where sheaths are connected to a pulley casing that houses a cable pulley. Each set of connection parts includes a respective adjustment nut that is independently adjusted by regulating the amount of cable that is taken-up or paid-out with respect to the cable pulley. Each set of connection parts must be independently locked at a desired position once the adjustments with the respective adjustment nuts are completed.

Referring additionally to FIGS. 7(A) to 7(D), an operation for adjusting cable tension with the tension adjustment mechanism according to the related steering device will now be described. The pair of locking nuts is loosened, and the pair of adjustment nuts is turned so as to move the sheaths in the direction indicated by arrow a in order to reduce cable tensions to zero (FIG. 7(A)). With the steering wheel restrained in the neutral position, one of the adjustment nuts is turned so as to move one of the sheaths in the direction indicated by arrow b in order to attain a target tension Ft for the cable (FIG. 7(B)). The restraint on the steering wheel is then released, and the pulley turns in the counterclockwise direction in the figures (FIG. 7(C)). Then the other adjustment nut is turned so as to move the other sheath in the direction indicated by arrow c in order to increase cable tension such that the pulley turns in the clockwise direction in the figures. These adjustments are repeated until the steering wheel is arranged in the neutral position and the tensions of both cables attain the target tension Ft (FIG. 7(D)). Finally, the pair of locking nuts is tightened so as to fix the adjustment nuts. Accordingly, because the adjustment operation for the related steering device requires separate adjustment of different adjusting nuts, i.e., one adjusting nut for each cable, the operation is cumbersome and time-consuming.

On the contrary, in accordance with aspects of embodiments of a cable-based steering device in accordance with the present invention, an adjustment operation requires only the relative movement of the parts of first pulley housing 55 (i.e., relative displacement of pulley supporting part 551 with respect to cable supporting part 552 in the take-up TU and pay-out PO directions of cables 53, 54) such that tension in cables 53, 54 can be simultaneously adjusted quickly and easily.

Thus, the tension adjustment operation is preferably an operation for adjusting the distance between the pulley and the first ends of the sheaths. As in the first embodiment, first pulley housing 55 may be divided into pulley supporting part 551 and cable supporting part 552, and cable supporting part 552 and pulley supporting part 551 are relatively displaceable in the take-up TU and pay-out PO directions of cables 53, 54 so as to simultaneously adjust the tensions of cables 53, 54.

According to the first embodiment, the cable-base steering device adjusts the tension of two cables 53, 54 by relative displacement of pulley supporting part 551 and cable supporting part 552. Insofar as pulley supporting part 551 supports steering side cable pulley 51 in a freely rotatable fashion, and cable supporting part 552 supports the first ends of two sheaths 57, 58, the distance between the pulley and the first ends of two sheaths 57, 58 changes in response to the relative movement of pulley supporting part 551 and cable supporting part 552. In other words, the adjustment of the tensions of cables 53, 54 can be realized by evenly moving the first ends of sheaths 57, 58 with respect to the pulley 51.

Thus, a tension adjustment operation of cables 53, 54 according to the first embodiment may be carried out quickly and easily through the simple operation of relatively moving pulley supporting part 551 and cable supporting part 552.

Tension Adjustment Operation of Cables

The tension adjustment operation of cables 53, 54 (i.e., the operation to adjust the distance between pulley supporting part 551 and cable supporting part 552) will now be described with reference to FIGS. 8(a) to 8(e).

To reduce the distance between pulley supporting part 551 and cable supporting part 552, locking nut 82 is loosened (FIG. 8(a)). With the restraint provided by locking nut 82 released, knurled thumb nut 81 is turned in one direction (for example, left-handed rotation) such that the relative positions of pulley supporting part 551 and cable supporting part 552 are brought closer together by virtue of the threaded engagement between screw shaft 80 and both supporting cases 551, 552. For example, the distance between supporting cases 551, 552 may be reduced in response to turning of knurled nut 81 and screw shaft 80 (FIG. 8(b)). Locking nut 82 is subsequently tightened against cable supporting part 552 and fixed there (FIG. 8(c)).

To increase the distance between pulley supporting part 551 and cable supporting part 552, locking nut 82 is loosened (FIG. 8(a)). With the restraint provided by locking nut 82 released, knurled thumb nut 81 is turned in another direction (for example, right-handed rotation) such that the relative positions of pulley supporting part 551 and cable supporting part 552 are moved apart by virtue of the threaded engagement between screw shaft 80 and both supporting cases 551, 552. For example, the distance between supporting cases 551, 552 may be increased in response to turning of knurled nut 81 and screw shaft 80 (FIG. 8(d)). Locking nut 82 is subsequently tightened against cable supporting part 552 and fixed there (FIG. 8(e)).

During the tension adjustment operation, the lengths of springs 42, 43 become equal to the distance between spring supporting surfaces 40b, 41b and cable supporting part 552. Preferably, the spring forces obtained by multiplying the amount of contraction from the free lengths of springs 42, 43 by their spring constant provides the tensions set for cables 53, 54, and cables 53, 54 are adjusted to approximately the same tension.

The cable-based steering device according to the first embodiment includes first tension adjustment mechanism A1, which adjusts the relative positional relationship in the take-up TU and pay-out PO directions of the cables 53, 54, and is provided between pulley supporting part 551 and cable supporting part 552. If and when readjustment of the tensions becomes necessary due to excessive/insufficient tensions or replacement of a component, the relative movement between the pulley supporting part and the cable supporting part makes readjustment possible. That is, the cable tension adjustment mechanism provided between pulley supporting part 551 and cable supporting part 552 allows any number of readjustments to be carried out to correct improper tensions due to excessive/insufficient tensions or due to replacement of a component.

According to the first embodiment of the cable-based steering device as shown in FIGS. 3 to 5, pulley supporting part 551 and cable supporting part 552 have a telescopic relationship. Preferably, first guiding convex surfaces 70, 71 protrude outwardly and may slidingly engage cable supporting part 552, and first guiding concave surfaces 72, 73 are formed on both sides of pulley supporting part 551. In addition, second convex surfaces 74, 75 protrude inwardly and may slidingly engage pulley supporting part 551, and second guiding concave surfaces 76, 77 are formed on both sides of cable supporting part 552. Preferably, first guiding convex surfaces 70, 71 and second convex surfaces 74, 75 are provided at positions such that they are shifted from each other in the take-up TU and pay-out PO directions of cables 53, 54, first guiding convex surfaces 70, 71 slidingly engage second guiding concave parts 76, 77 so as to provide relative movement in the take-up TU and pay-out PO directions of cables 53, 54, and second convex surfaces 74, 75 slidingly engage first guiding concave surfaces 72, 73 so as to provide relative movement in the take-up TU and pay-out PO directions of cables 53, 54.

Thus, a slide-supporting structure is provided in which a tubular part of a box-shaped pulley supporting part and a tubular part of a cable supporting part are telescopically fit together. Clearances may provide relative sliding capability; however, excessive clearance may result in wobbling between the pulley supporting and cable supporting parts during the cable tension adjustment operation and a stable support cannot be provided after the cable tension adjustment.

In contrast, according to the first embodiment, a slide-fitting structure is provided such that both pulley supporting part 551 and cable supporting part 552 are each supported at two side positions, i.e., at a total of four positions provided by surfaces 70, 71, 74, and 75. Accordingly, cable supporting part 552 may be slid with respect to pulley supporting part 551 in an orderly manner without wobbling during the cable tension adjustment operation, and cable supporting part 552 can also be supported stably with respect to pulley supporting part 551 at the same four positions even during use of the steering device, i.e., after the cable tension adjustment operation, so that unexpected shifting of the supporting positions can be prevented.

According to the first embodiment, the cable tension adjustment mechanism is provided with screw shaft 80 that is linked by threaded engagement to both pulley supporting part 551 and cable supporting part 552. Rotation by screw shaft 80 such as due to turning by the turning operation member (e.g., knurled nut 81) causes relative displacement between pulley supporting part 551 and cable supporting part 552 in the take-up TU and pay-out PO directions of cables 53, 54, and a locking member (e.g., locking nut 82) locks at the turning operation position as determined by the turning operation member.

Cable tension adjustment may require, for example, a first function to adjust the relative gap between the pulley supporting part and the cable supporting part, and a second function to maintain the integrity of the structure, i.e., not permit the parts to become disassociated. In order to meet these functions, a relative gap adjustment mechanism and a linking mechanism, respectively, may be provided for cable tension adjustment. However, both mechanisms may require operation and locking members such that the structure and operation required for cable tension adjustment becomes complicated.

On the contrary, as described above, a cable tension adjustment mechanism that includes screw shaft 80 provides relative gap adjustment while pulley supporting part 551 and cable supporting part 552 continue to be coupled together. Thus, turning knurled nut 81 and screw shaft 80 provide relative adjustability and at the same time maintain engagement between pulley supporting part 551 and cable supporting part 552.

Some of the features and advantages that are provided by the cable-based steering device according to the first embodiment will now be described.

First, the cable-based steering device includes steering side cable pulley 51 that is actuated by the driver, steering control wheel side cable pulley 52 that turns left and right front wheels 9a, 9b, two cables 53, 54 that are operatively coupled insofar as they are wound in opposite directions around both cable pulleys 51, 52, first pulley housing 55 that rotatably supports steering side cable pulley 51, second pulley housing 56 that rotatably supports steering control wheel side cable pulley 52, and two sheaths 57, 58 that cover cables 53, 54, respectively, while mechanically linking together both pulley housings 55, 56. First pulley housing 55 is split into pulley supporting part 551, which supports steering side cable pulley 51 in a freely rotatable fashion, and cable supporting part 552, which supports ends of both sheaths 57, 58. Supporting parts 551, 552 are coupled for relative displacement in the take-up TU and pay-out PO directions of cables 53, 54. Accordingly, the tensions of cables 53, 54 can be adjusted easily and quickly in the time it takes for the relative displacement of split first pulley housing 55.

Second, any number of readjustments can be carried out when the tensions of cables 53, 54 need to be readjusted due to excessive/insufficient tensions or replacement of a component. This is possible at least because first cable tension adjustment mechanism A1 is disposed between and used to adjust the relative positional relationship between pulley supporting part 551 and cable supporting part 552 in the take-up TU and pay-out PO directions of cables 53, 54.

Third, cable supporting part 552 may be slid with respect to pulley supporting part 551 in an orderly manner without wobbling during cable tension adjustment, and cable supporting part 552 can also be supported stably at four positions during use after the cable tension adjustment, so that shifting of the supporting positions at the first ends of sheaths 57, 58 can be prevented. This is possible at least because first guiding convex surfaces 70, 71 and first guiding concave surfaces 72, 73 are formed on both sides of pulley supporting part 551, second guiding convex surfaces 74, 75 and second guiding concave surfaces 76, 77 are formed on both sides of cable supporting part 552, and because first guiding convex surfaces 70, 71 and second guiding convex surfaces 74, 75 are shifted from each other in the take-up TU and pay-out PO directions of cables 53, 54, first guiding convex surfaces 70, 71 slidingly engage second guiding concave surfaces 76, 77 in the take-up TU and pay-out PO directions of cables 53, 54, and second guiding convex surfaces 74, 75 slidingly engage first guiding concave surfaces 72, 73 in the take-up TU and pay-out PO directions of cables 53, 54.

Fourth, the cable tension adjustment mechanism includes screw shaft 80 that threadingly engages both pulley supporting part 551 and cable supporting part 552, a turning operation member (e.g., knurled nut 81) for turning screw shaft 80, and a locking member (e.g., locking nut 82) for locking at the cable tension adjustment mechanism turning at the position determined by the turning operation member. Accordingly, relative displacement adjustment while keeping pulley supporting part 551 and cable supporting part 552 joined together is provided by screw shaft 80.

Fifth, first cable tension adjustment mechanism A1 may be provided by an extremely simple structure including screw shaft 80, knurled thumb nut 81 fixed to screw shaft 80, and locking nut 82 threadingly engaging screw shaft 80. Preferably, knurled nut 81 is fixed at the center part of sliding screw shaft 80 between first and second oppositely threaded portions 80a, 80b, and locking nut 82 threadingly engages second portion 80b so as to abuttingly engage cable supporting part 552 to preventing further tuning of screw shaft 80.

Second Embodiment

According to a second embodiment of a steering device, smooth turning of sliding screw shaft 80 is provided by threaded engagement on only one portion of screw shaft 80. Because the overall configuration of the second embodiment is generally similar to that of the first embodiment, and particularly the overall configuration shown in FIG. 1, only differences will be explained in detail.

Figure 9:
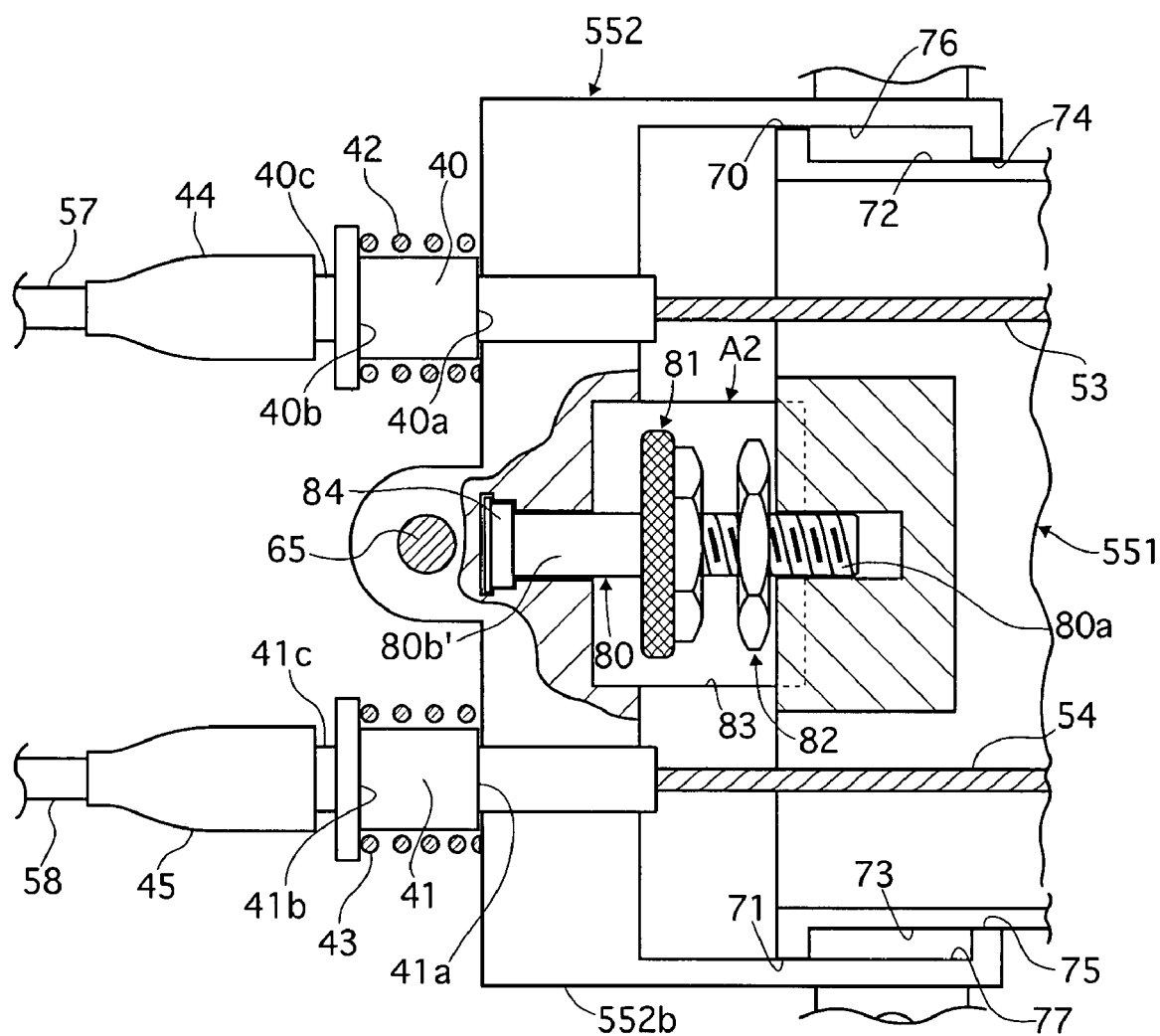
FIG. 9 is an enlarged cross sectional view of a cable tension adjustment mechanism in accordance with a second embodiment.

FIG. 9 shows an enlarged cross sectional view of a second cable tension adjustment mechanism A2. Second cable tension adjustment mechanism A2 includes a knurled nut 81 that is fixed at approximately the center of screw shaft 80, which is preferably disposed laterally between cables 53, 54. As in the first embodiment, knurled nut 81 provides the turning operation member for directly turning screw shaft 80. Locking nut 82 threadingly engages first threaded part 80*a* of screw shaft 80, and is locked when it is tightened so as to abuttingly engage pulley supporting part 551. In contrast to the first embodiment, a thrust bearing 84 is provided on a spindle part 80*b*' of the screw shaft 80. Thrust bearing 84 couples spindle part 80*b*' for relative rotation with respect to cable supporting part 552, however, relative axial displacement is prevented between spindle part 80*b*' and cable supporting part 552.

In the discussion of the second embodiment, the same reference numbers are used to designate the features that are similar to those of the first embodiment; therefore an explanation thereof is not repeated.

According to the second embodiment, thrust bearing 84 facilitates smooth turning of the screw shaft 80 without changing the turning operation torque, and the force required to turn knurled nut 81 may be reduced during cable tension adjustment. Otherwise, the functions of the second embodiment are similar to those of the first embodiment; thus an explanation thereof is not repeated.

Features and advantages of the cable-based steering device according to the second embodiment will now be described. These features and advantages are in addition to the aforementioned first through fourth features and advantages according to the first embodiment, and therefore an explanation thereof is not repeated.

Sixth, second cable tension adjustment mechanism A2 includes knurled nut 81, locking nut 82, and thrust bearing 84. Knurled nut 81 is preferably fixed at approximately the center of sliding screw shaft 80 and provides a turning operation member that is capable of directly turning sliding screw shaft 80. Preferably, locking nut 82 threadingly engages first threaded part 80*a* of screw shaft 80 and is locked when it abuttingly engages pulley supporting part 551. Thrust bearing 84 couples second spindle part 80*b*' and cable supporting part 552. Accordingly, second cable tension adjustment mechanism A2 provides a simple structure in which the force used to turn knurled nut 81 can be reduced during cable tension adjustment, and smooth turning can be realized without changing the turning operation torque.

Third Embodiment

According to a third embodiment of a steering device, worm wheels are fixed at approximately the center of each of two screw shafts, engaging the worm wheels are worm gears that are provided on a worm gear shaft, and an adjustment knob that is provided at an end of the worm gear shaft carries out the adjustment operation from a side surface of a pulley case. Because the overall configuration of the third embodiment is generally similar to that of the second embodiment, and particularly the overall configuration shown in FIG. 9, only differences will be explained in detail.

Figure 10:
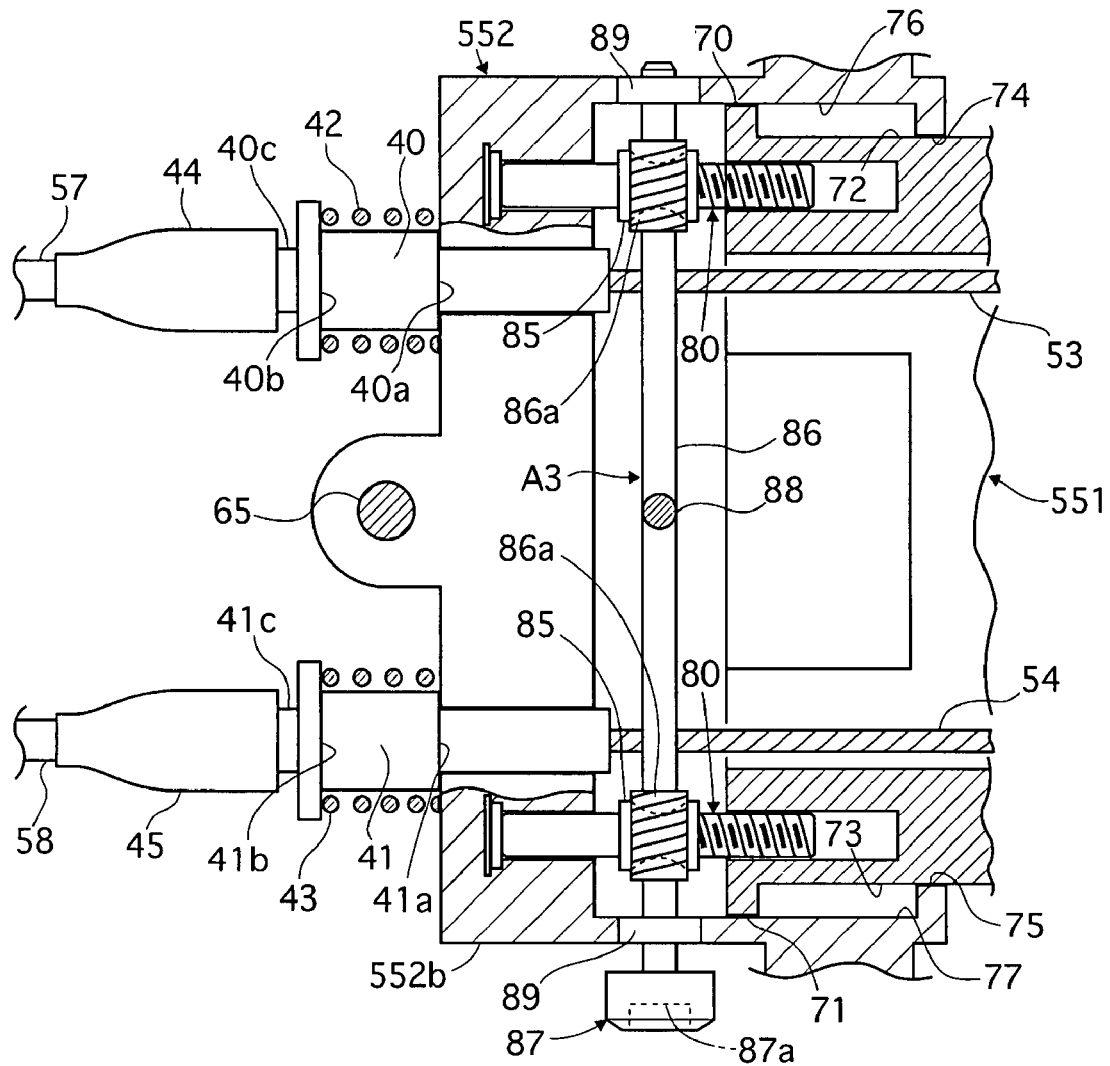
FIG. 10 is an enlarged cross sectional view of a cable tension adjustment mechanism in accordance with a third embodiment.
Figure 11:
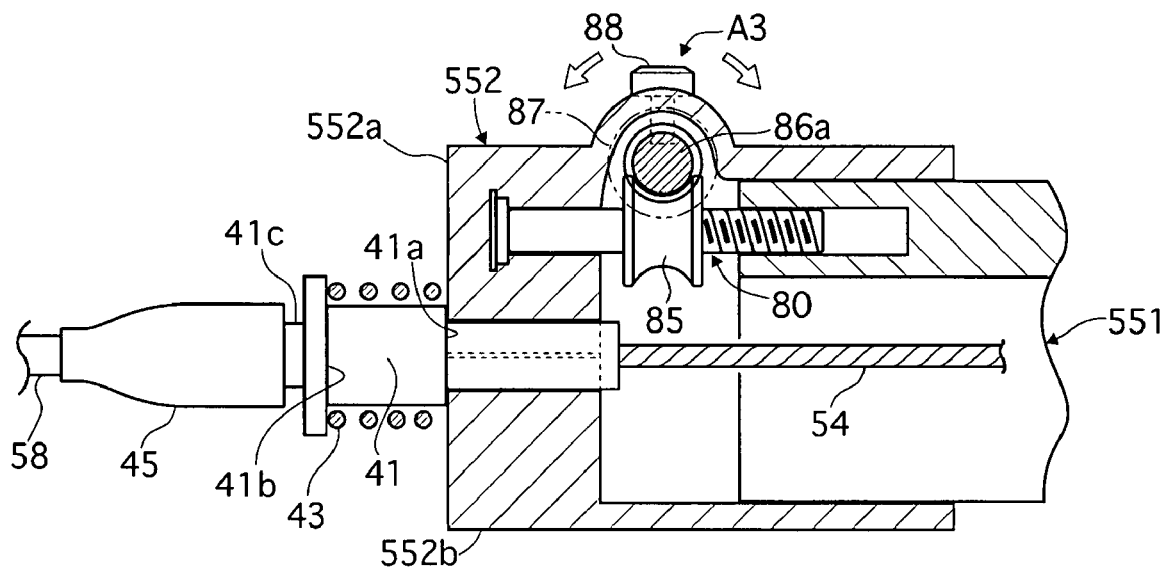
FIG. 11 is a vertical cross sectional view of the cable tension adjustment mechanism in accordance with the third embodiment.

FIGS. 10 and 11 show cross sectional views of a third cable tension adjustment mechanism A3. Third cable tension adjustment mechanism A3 includes a pair of worm wheels 85 and 85 that are fixed at approximately the respective centers of each of a pair of screw shafts 80 and 80, and are disposed generally parallel to cables 53, 54. Third cable tension adjustment mechanism A3 also includes a pair of worm gears 86*a* and 86*a* that each engage a corresponding one of worm wheels 85, 85, a worm gear shaft 86 is fixed for rotation with worm wheels 85, 85, and an adjustment knob 87 fixed at one end of worm gear shaft 86 provides the turning operation member. Additionally, a detent bolt 88 prevents turning of worm gear shaft 86 with respect to cable supporting part 552 and thereby provides the locking member.

A tool-insertion groove 87*a* in the form, for example, of a hexagonal groove, crisscross grooves, etc. is formed on an end surface of adjustment knob 87 so that a tool (for example, an Allen wrench, Phillips screwdriver, etc.—not shown;) may be inserted into tool-insertion groove 87*a* in order to turn worm gear shaft 86, worm gears 86*a*, 86*a*, worm wheels 85, 85, and screw shafts 80, 80 so as to cause relative displacement between pulley supporting part 551 and cable supporting part 552.

Bearings 89 and 89 may support worm gear shaft 86 for relative rotation with respect to cable supporting part 552.

Preferably, tightening detent bolt 88 with respect to cable supporting part 552 causes an end of detent bolt 88 to frictionally engage worm gear shaft 86 such that rotation of worm gear shaft 86 may be stopped.

In the discussion of the third embodiment, the same reference numbers are used to designate the features that are similar to those of the first embodiment; therefore an explanation thereof is not repeated.

According to the third embodiment, turning adjustment knob 87 either in the right hand direction or in the left hand direction during cable tension adjustment, causes worm gear shaft 86 with the pair of worm gears 86*a*, 86*a* to rotate, which causes the pair of worm wheels 85, 85 to rotate at a reduced speed. Rotation of worm wheels 85, 85 causes the pair of screw shafts 80, 80 to rotate, and pulley supporting part 551 and cable supporting part 552 are caused to slide relative to each other evenly so as to adjust the gap between both supporting parts 551 and 552. Inherently, worm gear sets cannot be backdriven. Accordingly, worm gears 86*a*, 86*a* may also prevent unintended rotation of worm wheels 85, 85 and screw shafts 80, 80.

Sliding cable supporting part 552 with respect to pulley supporting part 551 may be facilitated by two screw shafts 80, 80, which provide even smoother sliding than may be realized with a single screw shaft 80, and by disposing one of screw shafts 80, 80 in close proximity to each of the front ends of sheaths 57, 58. Further, the adjustment operation may be actuated from the side of pulley housings 55, 56 so as to avoid interference with peripheral components.

Bearings 89, 89 support worm gear shaft 86 for rotation with respect to cable supporting part 552 such that the force used to turn worm gear shaft 86 may be reduced, and smooth turning can be achieved without changing the turning operation torque. Otherwise, the functions of the third embodiment are similar to those of the first and second embodiments; therefore an explanation thereof is not repeated.

Features and advantages of the cable-based steering device according to the third embodiment will now be described. These features and advantages are in addition to the aforementioned first through fourth features and advantages according to the first and second embodiments, therefore an explanation thereof is not repeated.

Seventh, third cable tension adjustment mechanism A3 includes the pair of worm wheels 85, 85 that are fixed respectively at approximately the center of the pair of screw shafts 80, 80. Third cable tension adjustment mechanism A3 further includes the pair of worm gears 86*a*, 86*a* that respectively engage worm wheels 85, 85 and that are fixed on worm gear shaft 86, and adjustment knob 87 that is fixed at one end of worm gear shaft 86 provides the turning operation member. Detent bolt 88 prevents worm gear shaft 86 from turning with respect to cable supporting part 552 and thereby provides the locking member. Further, the adjustment operation can be carried out at the side of pulley housings 55, 56 so that the operation can be performed easily while avoiding interference with peripheral components.

Fourth Embodiment

According to a fourth embodiment of a steering device, a worm wheel is fixed at approximately the center of a screw shaft, a worm gear engages the worm wheel and is fixed on a worm gear shaft that extends perpendicularly to an imaginary plane between first ends of a pair of cables, and an adjustment knob is provided at an end of the worm shaft. The worm gear shaft is turned with respect to at least one of the upper and lower surfaces of the pulley case in order to carry out an adjustment operation. Because the overall configuration of the fourth embodiment is generally similar to that of the second embodiment, and particularly the overall configuration shown in FIG. 9, only differences will be explained in detail.

Figure 12:
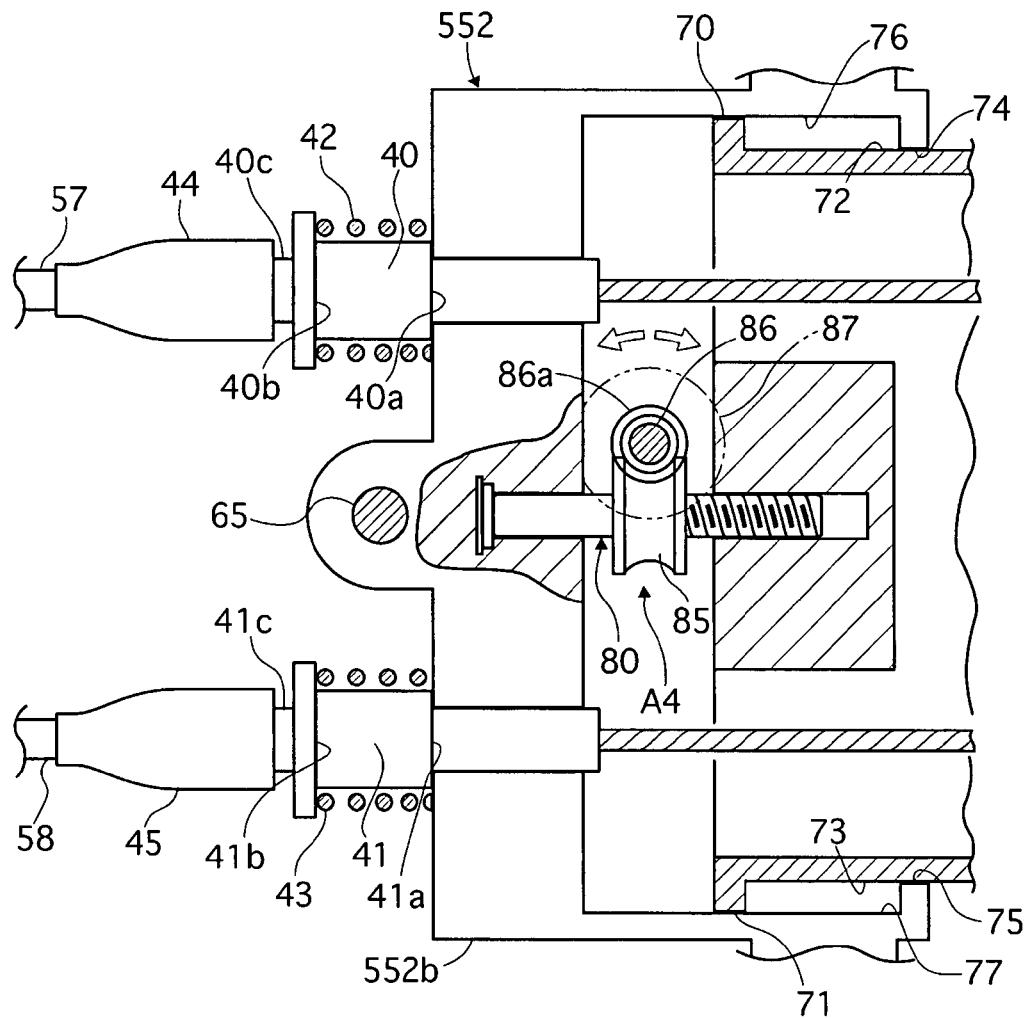
FIG. 12 is an enlarged cross sectional view of a cable tension adjustment mechanism in accordance with a fourth embodiment.
Figure 13:
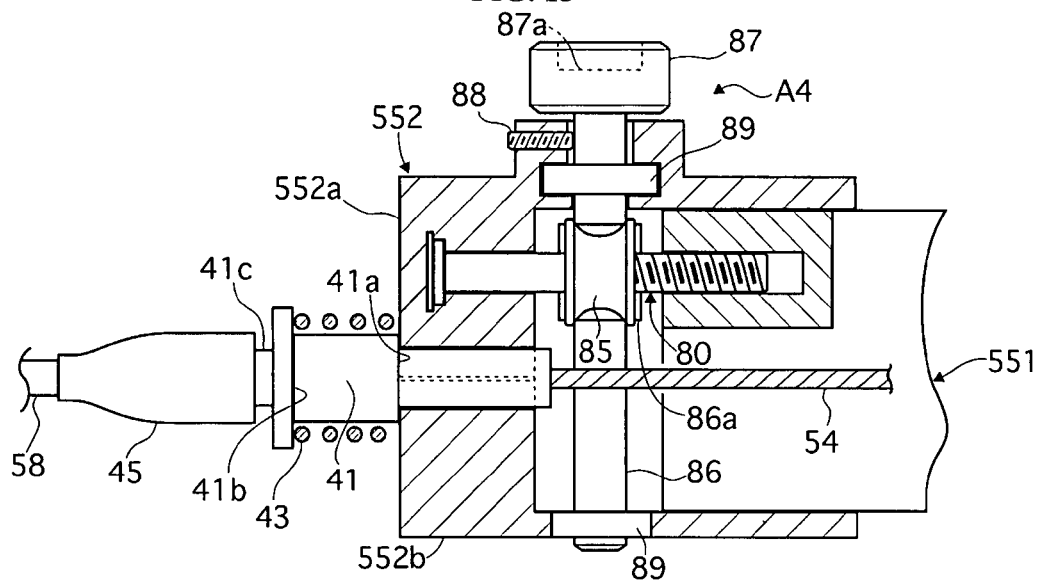
FIG. 13 is a vertical cross sectional view of the cable tension adjustment mechanism in accordance with the fourth embodiment.

FIGS. 12 and 13 show cross sectional views of a fourth cable tension adjustment mechanism A4. Fourth cable tension adjustment mechanism A4 includes a worm wheel 85 fixed at approximately the center of a single screw shaft 80, which is disposed approximately midway between cables 53, 54, a worm gear 86a engages with worm wheel 85, a worm gear shaft 86 extends perpendicularly to an imaginary plane between first ends of a pair of cables 53, 54, and an adjustment knob 87 is provided at an end of worm gear shaft 86 so as to provide the turning operation member. A detent bolt 88 prevents worm gear shaft 86 from turning with respect to cable supporting part 552 so as to provide the locking member.

A tool-insertion groove 87a in the form, for example, of a hexagonal groove, crisscross grooves, etc. is formed on an end surface of adjustment knob 87 so that a tool (for example, an Allen wrench, Phillips screwdriver, etc.—not shown) may be inserted into tool-insertion groove 87a in order to turn worm gear shaft 86, worm gear 86a, worm wheel 85, and screw shaft 80 so as to cause relative displacement between pulley supporting part 551 and cable supporting part 552.

Bearings 89 and 89 may support worm gear shaft 86 for relative rotation with respect to cable supporting part 552.

Preferably, tightening detent bolt 88 with respect to cable supporting part 552 causes an end of detent bolt 88 to frictionally engage worm gear shaft 86 such that rotation of worm gear shaft 86 may be stopped.

In the discussion of the fourth embodiment, the same reference numbers are used to designate the features that are similar to those of the first embodiment; therefore an explanation thereof is not repeated.

According to the fourth embodiment, turning adjustment knob 87 either in the right hand direction or in the left hand direction during cable tension adjustment, causes worm gear shaft 86 with worm gear 86a to rotate, which causes worm wheels 85 to rotate at a reduced speed. Rotation of worm wheel 85 causes screw shaft 80 to rotate, and pulley supporting part 551 and cable supporting part 552 are caused to slide relative to each other evenly so as to adjust the gap between both supporting parts 551 and 552. Inherently, worm gear sets cannot be backdriven. Accordingly, worm gear 86a may also prevent unintended rotation of worm wheel 85 and screw shaft 80.

Bearings 89, 89 support worm gear shaft 86 for rotation with respect to cable supporting case upper 552a and cable supporting case lower 552b such that the force used to turn worm gear shaft 86 may be reduced, and smooth turning can be achieved without changing the turning operation torque. Otherwise, the functions of the third embodiment are similar to those of the first and second embodiments; thus an explanation thereof is not repeated.

Features and advantages of the cable-based steering device according to the fourth embodiment will now be described. These features and advantages are in addition to the aforementioned first through fourth features and advantages according to the first and second embodiments, therefore an explanation thereof is not repeated.

Eighth, fourth cable tension adjustment mechanism A4 includes worm wheel 85 that is fixed at approximately the center of single sliding screw shaft 80, which is disposed approximately midway between cables 53, 54. Fourth cable tension adjustment mechanism A4 further includes worm gear 86a that engages worm wheel 85 fixed on worm gear shaft 86, which extends perpendicularly to an imaginary plane between first ends of a pair of cables 53, 54, and adjustment knob 87 that is fixed at the upper end part of worm gear shaft 86 provides the turning operation member. Detent bolt 88 prevents worm gear shaft 86 from turning with respect to cable supporting part 552 and thereby provides the locking member. During the tension adjustment operation, relative positions of pulley supporting part 551 and cable supporting part 552 may be adjusted by turning adjustment knob 87 in either the right hand direction or in the left direction.

In the first through fourth embodiments, the first pulley housing is shown as divided into the pulley supporting case upper and the pulley supporting case lower; however, the first pulley housing may be alternately constituted. Further, the first through fourth embodiments show and describe only the first housing as including a pulley supporting part and a cable supporting part. However, the second housing in the steering device may alternatively or additionally include a pulley supporting part and a cable supporting part. Moreover, the first through fourth embodiments show and describe the cable tension adjustment mechanism as being structurally integrated with respect to the pulley housing; however, it is also envisioned that these two features may be separated, i.e., not directly mechanically coupled. In sum, many different configurations are envisioned although, regardless of configuration, preferably at least one of the first and second pulley housings includes a pulley supporting part that rotatably supports the pulley and includes a cable supporting part that supports two ends of the two sheaths in such a manner as to be relatively displaceable with respect to the pulley supporting part in the take-up and pay-out directions of two cables.

Although an example in which a cable-based steering device is provided as a backup mechanism to a steer-by-wire system, it is also envisioned that a cable-based power steering device that includes cables in place of a steering column shaft, for example, may also be provided. In sum, many different configurations of cable-based steering systems are envisioned so long as, preferably, two sheaths mechanically couple two pulley housings and two cables rotationally couple two pulleys.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A steering device, comprising:
   a first housing including:
      a first part supporting a first cable pulley for relative rotation with respect to the first housing;
      a second part being disposed for relative displacement with respect to the first part of the first housing; and
   a second housing supporting a second cable pulley for relative rotation with respect to the second housing;

a first cable at least partially wound on the first cable pulley in a first direction of rotation of the first cable pulley;

a second cable at least partially wound on the first cable pulley in a second direction of rotation of the first cable pulley;

wherein the first cable and the second cable are wound on the second cable pulley so that the first pulley and second pulley are rotationally coupled via the first and second cables;

a first sheath extending between first and second ends, the first cable being slidingly disposed in the first sheath, and the first end of the first sheath being coupled to the second part of the first housing;

a second sheath extending between first and second ends, the second cable being slidingly disposed in the second sheath, and the first end of the second sheath being coupled to the second part of the first housing; and an adjuster being disposed between the first and second parts of the first housing, the adjuster, the adjuster including a turning operator disposed between the first and second parts of the first housing;

wherein one of the first and second cable pulleys is adapted to rotate in response to an actuation part being operated by a driver, and the other of the first and second cable pulleys is adapted to rotate a wheel turning part to turn a steering control wheel; and wherein a first actuation of the adjuster simultaneously increases tension in the first and second cables, and a second actuation of the adjuster simultaneously decreases tension in the first and second cables.

2. The steering device according to claim 1, wherein the adjuster further comprises:

a shaft including first and second portions, at least a first one of the first and second portions threadingly engaging a first one of the first and second parts of the first housing, and a second one of the first and second portions engaging a second one of the first and second parts of the first housing;

wherein rotation of the shaft causes relative displacement of the first and second parts of the first housing.

3. The steering device according to claim 2, wherein the adjuster comprises:

a locking member preventing rotation of the shaft with respect to the second part of the first housing;

wherein the turning operator rotates the shaft.

4. The steering device according to claim 3, wherein the turning operator comprises a wheel fixed to the shaft between the first and second portions, the first portion of the shaft comprises right-handed threads threadingly engaging the first one of the first and second parts of the first housing, the second portion of the shaft comprises left-handed threads threadingly engaging the second one of the first and second parts of the first housing, and the locking member comprises a nut threadingly engaging one of the first and second portions of the shaft and adapted to abuttingly engage one of the first and second parts of the first housing.

5. A steering device, comprising:

a first housing including:

a first part supporting a first cable pulley for relative rotation with respect to the first housing;

a second part being disposed for relative displacement with respect to the first part of the first housing; and a second housing supporting a second cable pulley for relative rotation with respect to the second housing;

a first cable at least partially wound on the first cable pulley in a first direction of rotation of the first cable pulley;

a second cable at least partially wound on the first cable pulley in a second direction of rotation of the first cable pulley;

wherein the first cable and the second cable are wound on the second cable pulley so that the first pulley and second pulley are rotationally coupled via the first and second cables;

a first sheath extending between first and second ends, the first cable being slidingly disposed in the first sheath, and the first end of the first sheath being coupled to the second part of the first housing;

a second sheath extending between first and second ends, the second cable being slidingly disposed in the second sheath, and the first end of the second sheath being coupled to the second part of the first housing; and at least one adjuster being disposed between the first and second parts of the first housing, the at least one adjuster including a turning operator disposed between the first and second parts of the first housing;

wherein a first actuation of the adjuster simultaneously increases tension in the first and second cables, and a second actuation of the adjuster simultaneously decreases tension in the first and second cables.

6. The steering device according to claim 5, wherein each of the at least one adjuster further comprises:

a shaft including first and second portions, at least a first one of the first and second portions threadingly engaging a first one of the first and second parts of the first housing, and a second one of the first and second portions threadingly engaging a second one of the first and second parts of the first housing;

wherein rotation of the shaft causes relative displacement of the first and second parts of the first housing.

7. The steering device according to claim 6, further comprising:

a locking member preventing rotation of the turning operator with respect to the second part of the first housing;

wherein the turning operator rotates the shaft of the at least one adjuster.

8. The steering device according to claim 1, wherein the first and second parts of the first housing define telescopically related tubular parts that are relatively displaceable along an axis parallel to take-up and pay-out directions of the first and second cables with respect to the first cable pulley.

9. The steering device according to claim 8, wherein the tubular parts comprise:

a pair of first guiding convex surfaces extending from the first part of the first housing and slidingly engaging the second part of the first housing; and a pair of second guiding convex surfaces extending from the second part of the first housing and slidingly engaging the first part of the first housing, the pair of second guiding convex surfaces being axially displaced with respect to the pair of first guiding convex surfaces.

10. The steering device according to claim 1, further comprising:

the second housing including:

a first part supporting a second cable pulley for relative rotation with respect to the second housing; and a second part disposed for relative displacement with respect to the first part of the second housing;

wherein the first cable is at least partially wound on the second cable pulley in a first direction of rotation of the second cable pulley, the second cable is at least partially wound on the second cable pulley in a second direction of rotation of the second cable pulley, and the second ends of the first and second sheaths are coupled to the second part of the second housing.

* * * * *